United States Patent
Liu et al.

(10) Patent No.: US 11,707,672 B2
(45) Date of Patent: *Jul. 25, 2023

(54) PLAYER DENSITY BASED REGION DIVISION FOR REGIONAL CHAT

(71) Applicant: Niantic, Inc., San Francisco, CA (US)

(72) Inventors: Jiahuan Liu, Sunnyvale, CA (US); Mingliang Wei, San Jose, CA (US); Daniel Casadevall Pino, San Jose, CA (US); Charu Janqid, San Francisco, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,371

(22) Filed: Mar. 10, 2022

(65) Prior Publication Data
US 2022/0193539 A1    Jun. 23, 2022

Related U.S. Application Data

(63) Continuation of application No. 16/676,287, filed on Nov. 6, 2019, now Pat. No. 11,285,382.

(51) Int. Cl.
*A63F 13/30*    (2014.01)
*A63F 13/216*   (2014.01)
(Continued)

(52) U.S. Cl.
CPC ............ *A63F 13/30* (2014.09); *A63F 13/216* (2014.09); *A63F 13/40* (2014.09); *A63F 13/65* (2014.09);
(Continued)

(58) Field of Classification Search
CPC ........ A63F 13/30; A63F 13/87; A63F 13/216; A63F 13/65; A63F 13/40; A63F 13/79; A63F 2300/5573; A63F 2300/406
See application file for complete search history.

(56) References Cited

U.S. PATENT DOCUMENTS

| 2004/0039579 A1 | 2/2004 | Chithambaram et al. |
| 2008/0215681 A1 | 9/2008 | Darcie et al. |

(Continued)

FOREIGN PATENT DOCUMENTS

| JP | 2019-164645 A | 9/2019 |
| TW | 201250577 A | 12/2012 |
| TW | 201338836 A | 10/2013 |

OTHER PUBLICATIONS

Borgwardt, S. et al., "A balanced k-means algorithm for weighted point sets," arXiv preprint arXiv:1308.4004, 2013, pp. 1-13.

(Continued)

*Primary Examiner* — Thomas H Henry
(74) *Attorney, Agent, or Firm* — Fenwick & West LLP

(57) ABSTRACT

The virtual location of a player in a location-based game is determined from the real-world location of the player's client device. The location-based game provides the player access to one or more chat room based on their location. To determine the locations of chat room, a server analyzes player locations in a geographic region, clusters player locations to identify centroids, and adjusts the clusters based on constraints. The server selects chat room locations (e.g., at points of interest) to more evenly balance the number of players in each chat room while complying with one or more restraints on the size of the geographic area served by each chat room.

20 Claims, 13 Drawing Sheets

(51) Int. Cl.
*A63F 13/40* (2014.01)
*A63F 13/65* (2014.01)
*A63F 13/79* (2014.01)
*A63F 13/87* (2014.01)

(52) U.S. Cl.
CPC .............. *A63F 13/79* (2014.09); *A63F 13/87* (2014.09); *A63F 2300/406* (2013.01); *A63F 2300/5573* (2013.01); *A63F 2300/69* (2013.01)

(56) References Cited

U.S. PATENT DOCUMENTS

| | | | |
|---|---|---|---|
| 2012/0254774 A1* | 10/2012 | Patton | H04L 51/222 |
| | | | 715/758 |
| 2012/0283007 A1 | 11/2012 | Sanders | |
| 2012/0323689 A1 | 12/2012 | Metcalf et al. | |
| 2013/0036134 A1* | 2/2013 | Neven | G06F 16/951 |
| | | | 707/769 |
| 2014/0143407 A1* | 5/2014 | Zhang | H04L 67/00 |
| | | | 709/224 |
| 2016/0054865 A1 | 2/2016 | Kerr et al. | |
| 2018/0262291 A1 | 9/2018 | Doster et al. | |
| 2018/0359287 A1 | 12/2018 | Dorcey | |

OTHER PUBLICATIONS

Chang, X. et al., "Balanced k-means and min-cut clustering," arXiv preprint arXiv:1411.6235, 2014, pp. 1-9.
He, R. et al., "Balanced k-means algorithm for partitioning areas in large-scale vehicle routing problem," Intelligent Information Technology Application, 2009. IITA 2009. Third International Symposium on, 2009, vol. 3. IEEE, pp. 87-90.
PCT International Search Report and Written Opinion, PCT Application No. PCT/IB20/60189, dated Mar. 25, 2021, 14 pages.
Taiwan Intellectual Property Office, Office Action, TW Patent Application No. 109138758, dated Jul. 29, 2021, 13 pages.
European Patent Office, Extended European Search Report and Opinion, EP Patent Application No. 20884387.0, dated Jan. 18, 2023, 12 pages.
Japan Patent Office, Office Action, JP Patent Application No. 2022-525968, dated Dec. 6, 2022, eight pages.
United States Office Action, U.S. Appl. No. 16/676,287, dated Apr. 15, 2021, 15 pages.

* cited by examiner

PLAYER DENSITY BASED REGION DIVISION FOR REGIONAL CHAT

CROSS-REFERENCED TO RELATED APPLICATIONS

This application is a continuation of U.S. patent application Ser. No. 16/676,287, filed Nov. 6, 2019, which is incorporated by reference in its entirety.

TECHNICAL FIELD

The present disclosure relates generally to location-based gaming and, in particular, to determining chat room locations in such games.

BACKGROUND

Location-based games use the real world as their geography. Parallel reality games are a type of location-based game that use a virtual world that parallels the real-world geography. Players can interact and perform various game objectives in the parallel virtual world by navigating and performing actions in the real world. To communicate within the parallel reality game, players may converse in chat rooms located throughout the virtual world. For example, a player may join one chat room to communicate with other players during a raid. However, if the player moves to a new location within the real world to participate in other virtual experiences with a different group of players, the original chat room located near the raid would not be connected to other players nearby in the real world who may be using other chat rooms. In addition, even if the player only moves a short distance away from the original chat room, the virtual experiences and players nearby may be different than those at the player's original location.

SUMMARY

In a location-based parallel reality game, players navigate a virtual world by through the real world with a location-aware client device, such as a smartphone. As players navigate the virtual world to particular in virtual experiences or interact with virtual elements, they may chat with one another via chat rooms strategically located within the virtual world. These chat rooms may be regionally placed in the virtual world, such that they are located near geographic locations with a large observed density of player locations. Chat rooms may also be located near points of interest within the parallel reality game, such as virtual elements or virtual experiences.

Many client devices used by players in the parallel reality game may include positioning devices that track player location information as players move throughout the real world while playing the parallel reality game. In various embodiments, client devices send the player location information to a server that hosts the parallel reality game. The game server determines chatroom locations based on the player location information.

In one embodiment, the game server determines chat room locations for a geographic region by iteratively clustering the player locations within the geographic region into centroid areas, adjusting the clusters to more evenly balance the number of players associated with each centroid area while still dispersing the chat rooms in a way that accounts for the natural groupings of players in the real world. Once the chat rooms locations have been determined, the game server may select chat rooms for individual users based on their current location within the game and provide messages from the chat rooms to the users.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Figure 1:
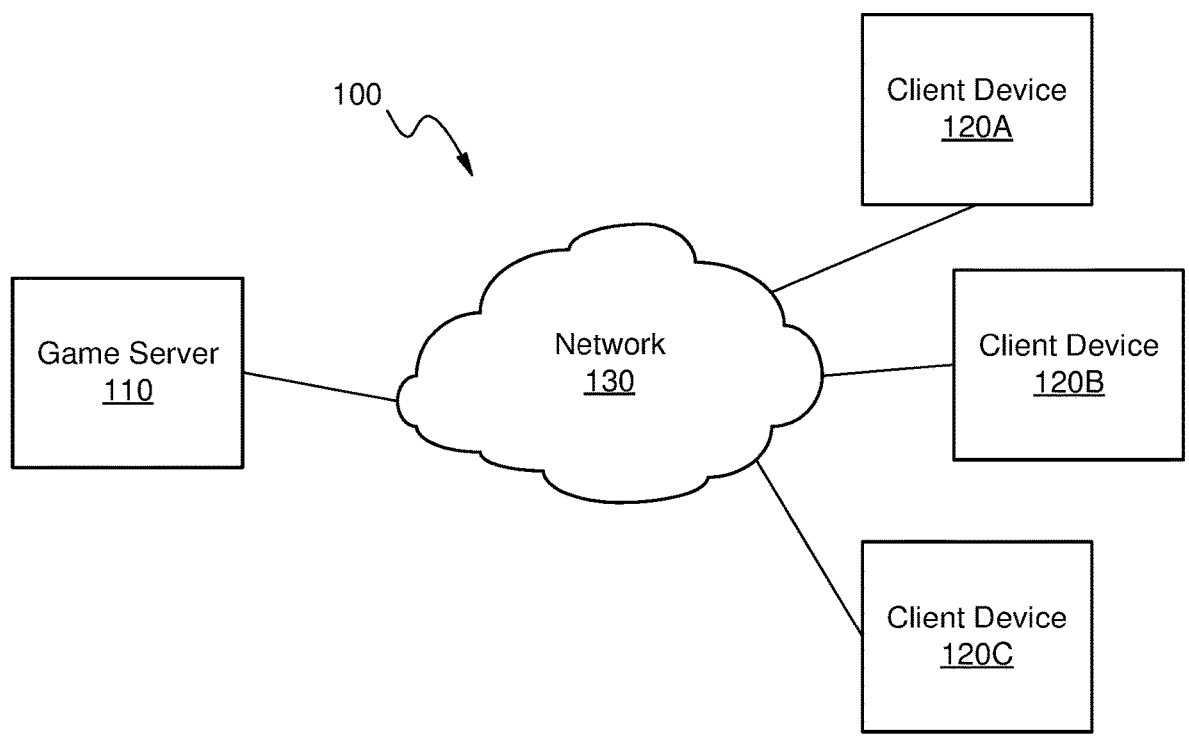
FIG. 1 is a block diagram illustrating a networked computing environment suitable for operating a location-based game, according to one embodiment.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality. Also, where similar elements are identified by a reference number followed by a letter, a reference to the number alone in the description that follows may refer to all such elements, any one such element, or any combination of such elements.

Overview

Generally, the present disclosure relates to determining chat room locations for parallel reality games that occur in virtual worlds that are mapped to real world locations.

A game server can host a location-based parallel reality game having a player gaming area that includes a virtual environment with a geography that parallels at least a portion of the real-world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one aspect, the positions of players can be monitored or tracked using, for instance, a positioning system (e.g. a GPS system) associated with a player's mobile computing device (e.g. a cell phone, smartphone, gaming device, or other device). As players move about in the real world, player location information can be provided to the game server hosting the parallel reality game over a network. The game server can update player locations in the parallel virtual world to correspond with the player locations in the real world.

The parallel reality game can also include one or more points of interest that players can interact with during the course of the parallel reality game. Points of interest may include, but are not limited to, virtual elements, virtual objects, virtual experiences, and the like. Points of interest may also be located at virtual locations that correspond to the real-world locations of landmarks, stores, recreational areas, or other real-world features that may be of interest to players. To interact with points of interest, a player may travel to the corresponding location of the point of interest in the real world and select the point of interest in the parallel reality game.

As players navigate and interact with the virtual world, they may communicate with one another via chat rooms located throughout the virtual world. When a player joins a chat rooms, they may send and receive messages with other players in the chat room. Chat rooms may be located at a subset of the points of interest. According to aspects of the present disclosure, chat room locations can be determined based on player location data gather by game player's client devices as they navigate the virtual world. The data can be analyzed to determine chat room locations that balance minimizing the average distance between player locations and the nearest chat rooms with equalizing the number of players in each chat room.

In one embodiment, a game server associated with a parallel reality game can access data associated with the location of individuals in the real world. The data associated with the location of individuals in the real world can be obtained or derived from any suitable source. The data associated with the location of individuals in the real world can include the real-world positions of mobile device associated with those individuals. In particular, users of mobile devices, such as smart phones, can optionally provide position information, in terms of geographic location in the real world, in order to enhance certain location-based features or other functionality. Any information optionally provided by mobile device users can be provided on conditions of anonymity to protect the privacy of the user optionally providing the position information.

Data associated with the locations of individuals in the real world can also include data associated with the locations of players of the parallel reality game. In particular, the game server can receive a snapshot of device position information at a given time from each client device of players of the parallel reality game. The game server can analyze the snapshot to determine locations of individuals in the real world and generate chat room locations based on such data. The game server may use these chat rooms locations for a given period of time (e.g., a day, month, year, etc.) and may periodically update the chat room locations using a new snapshot of player device information.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real-world geography such that player movement and actions in the real-world affect actions in the virtual world and vice versa. Those of ordinary skill in the art, using the disclosures provided herein, should understand that the subject matter of the present disclosure is equally applicable to other gaming systems.

FIG. 1 illustrates an exemplary computer-implemented location-based gaming system 100 configured in accordance with an embodiment. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world. For example, a coordinate system in the real world (e.g., longitude and latitude) may be mapped to a coordinate system in the virtual world (e.g., x/y coordinates, virtual longitude and latitude, etc.).

In the embodiment shown in FIG. 1, the system 100 has a client-server architecture, where a game server 110 communicates with one or more client devices 120 over a network 130. Although three client devices 120 are illustrated in FIG. 1, any number of client devices 120 can be connected to the game server 110 over the network 130. In other embodiments, the distributed location-based gaming system 100 includes different or additional elements. Furthermore, the functions may be distributed among the elements in a different manner than described.

The game server 110 hosts a master state of the location-based game and provides game status updates to players' client devices 120 (e.g., based on actions taken by other players in the game, changes in real-world conditions, changes in game state or condition, etc.). The game server 110 receives and processes input from players in the location-based game. Players may be identified by a username or player ID (e.g., a unique number or alphanumeric string) that the players' client devices 120 send to the game server 110 in conjunction with the players' inputs.

For example, the game server 110 may determine locations for chat rooms based on a snapshot of device position information, which indicates a multitude of player locations in the real world. The game server 110 breaks a geographic region of a map into cells (e.g., S-cells) and creates aggregated points weighted by the number of player locations within each cell. The game server determines centroids using a clustering algorithm (e.g., an iterative k-means clustering algorithm) and iterative border adjustment. The game server determines chat room locations based on the centroids. The chat room locations may be points of interest on the map, such as monuments, stores, public buildings, sculptures, or other identifiable real-world locations. For each chat room located within the virtual world, the game server 110 may select and provide messages to players of the parallel reality game. Various embodiments of the game server 110 are described in greater detail below, with reference to FIG. 3.

The client devices 120 are computing devices with which players can interact with the game server 100. For instance, a client device 120 can be a smartphone, portable gaming device, tablet, personal digital assistant (PDA), cellular phone, navigation system, handheld GPS system, or other such device. A client device 120 may execute software (e.g., a gaming application or app) to allow a player to interact with the virtual world. A client device 120 may also include hardware, software, or both for providing a user interface for chat rooms. A user may choose to join a chat room and send and receive messages via the user interface. Various embodiments of client device 120 are described in greater detail below, with reference to FIG. 2.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, S1v1TP, FTP), encodings or formats (e.g. HTML, JSON, XML), and/or protection schemes (e.g. VPN, secure HTTP, SSL).

Figure 2:
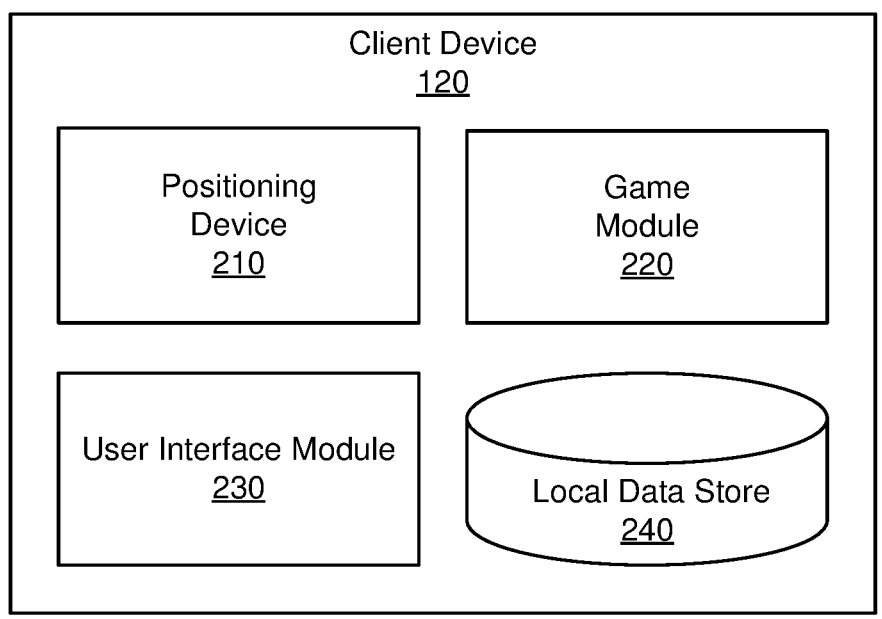
FIG. 2 is block diagram of a client device shown in FIG. 1, according to one embodiment.

FIG. 2 is block diagram of a client device 120 shown in FIG. 1, according to one embodiment. Because the gaming system 100 is for a location-based game, the client device 120 is preferably a portable computing device, such as a smartphone or other portable device, that can be easily carried or otherwise transported with a player. A player can interact with the virtual world simply by carrying or transporting the client device 120 in the actual world. The client device 120 can include a positioning device 210 that monitors the position of the client device 120 in the real world. The positioning device 210 can be any device or circuitry for monitoring the position of the client 120. For example, the positioning device 210 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 210 tracks the position of the player's client device 120 and provides the client device position information to the game module 220. The game module 220 updates the player's location in the virtual world based on coordinates of the position of the player's client device 120 in the real world. Thus, game module 220 maintains a local state of the virtual world on the client device 120. The game module 220 can provide player location information to the game server 110 over the network 130 such that the game server 110 maintains a total game state with updated player locations and provides the game module 220 with periodic updates so that the local game state can reflect the total game state.

The game module 220 communicates information about the virtual world with the user interface module 230. The user interface module 230 of the client device 120 constructs and displays components of the user interfaces of the client device 120. The user interface may display depictions of the virtual world to the user including components of the virtual world, such as virtual elements and virtual experiences, as received from the game module 220. The user interface module 230 may also display chat room locations in the virtual world, as well as messages sent between users in the chat rooms. A user may interact with the client device 120 to engage with virtual elements, participate in virtual experiences, or converse in chat rooms. For example, the user interface module 230 may display a view of the virtual world depicting points of interest, chat rooms, and other virtual experiences. The user of the client device 120 can interact with these components via the user interface to complete a task, join a chat room, or participate in a raid, among other actions.

The local data store 240 is one or more computer-readable media configured to store data used by the client device 120. For example, the local data store 240 may store the player location information tracked by the positioning device 210, a local copy of the current state of the parallel reality game, or any other appropriate data. Although the local data store 240 is shown as a single entity, the data may be split across multiple media. Furthermore, data may be stored elsewhere (e.g., in a distributed database) and accessed remotely via the network 130.

Figure 3:
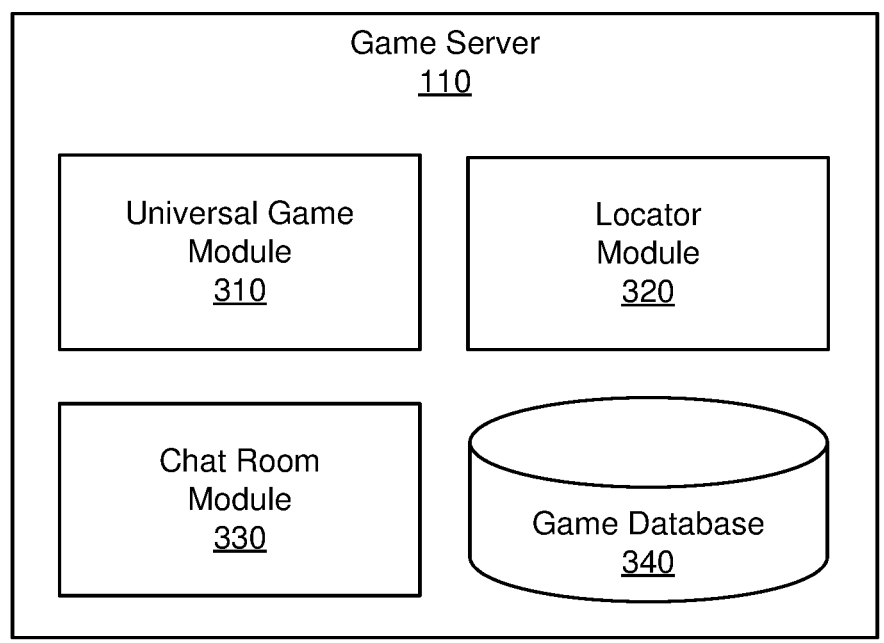
FIG. 3 is a block diagram of the game server shown in FIG. 1, according to one embodiment.

FIG. 3 illustrates one embodiment of the game server 110 suitable for hosting a location-based parallel-reality game. In the embodiment shown, the game server 110 includes a universal game module 310, a locator module 320, a chat room module 330, and a game database 340. In other embodiments, the game server 110 contains different or additional elements. In addition, the functions may be distributed among the elements in a different manner than described.

The game server 110 can be configured to receive requests for game data from one or more client devices 120 (for instance, via remote procedure calls (RPCs)) and to respond to those requests via the network 130. For instance, the game server 110 can encode game data in one or more data files and provide the data files to a client device 120. In addition, the game server 110 can be configured to receive game data (e.g. player location, player actions, player input, etc.) from one or more client devices 120 via the network 130. For instance, the client device 120 can be configured to periodically send player input, player location, and other updates to the game server 110, which the game server 110 uses to update game data in the game database 340 to reflect changed conditions for the game. The game server 110 may also send game data to client devices 120, such as other player locations, chat room locations, virtual element locations.

The universal game module 310 hosts the location-based game for players and acts as the authoritative source for the current status of the location-based game. The universal game module 310 receives game data from client devices 120 (e.g., player input, player location, player actions, player status, landmark information, etc.) and incorporates the game data received into the overall location-based game for all players of the location-based game. With the game data, the universal game module 310 stores a total game state of the game that can be sent to a client device 120 to update the local games state in the game module 220. The universal game module 310 can also manage the delivery of game data to the client devices 120 over the network 130.

The locator module 320 can be a part of or separate from the universal game module 310. The locator module 320 is configured to access data associated with real world actions, analyze the data, and determine virtual experiences in the virtual world based on the data associated with real world actions. For instance, the locator module 320 can modify game data stored in the game database 340 to locate virtual experiences in the virtual world based on the data associated with real world actions. As an example, a sponsored virtual element may be at a virtual location that corresponds to the real-world location of a sponsor's store, restaurant, outlet, etc. If a player makes a purchase, enters a code made available at the real-world location, or takes another action at the real-world location action meeting specified criteria, a special virtual experience may be made available to the player in the parallel-reality game.

The chat room module 330 determines chat room locations in the virtual world based on player locations. The chat room locations may correspond to points of interest in the real world. The chat room module 330 analyzes the player locations gathered from client devices 120 in the universal game module 310 and uses a clustering and border adjustment method to identify groups of players that each correspond to a geographic area. The chat room module 330 may identify a point of interest in each geographic area as a chat room location based on the data about players in that area (e.g., by comparing a centroid of the player locations to the locations of points of interest or by analyzing the frequency or amount if interaction between players and virtual elements located at points of interest, etc.). The chat room module 330 may update the chat room locations periodically (e.g., daily, weekly, monthly, etc.) or when triggered by a provider via the game server 110. The chat room module 330 provides the chat room locations to the universal game module 310, which includes the chat rooms in the total game state, and provides messages between users of the chat rooms.

In various embodiments, the chat room module 330 performs iterative k-means clustering before iterative border adjustment to determine the chat room locations. Using k-means clustering alone may result in some centroids that correspond to much larger numbers of players than others. For example, chat rooms in high density regions (e.g., within cities) may have large numbers of players assigned to them, resulting in crowded chat rooms in which conversation moves too rapidly for players to easily follow. Conversely, chat rooms in low density regions (e.g., rural areas) may include relatively few players and players may become frustrated with the lack of interaction. The border adjustment counters this by bringing the number of players associated with each chat room closer to being equal. The chat rooms may remain at the determined chat room locations in the virtual world until the game server 110 triggers the chat room module 330 to update the chat room locations (e.g., when a certain period of time has passed).

Generally, to determine chat room locations, the chat room module 330 accesses player locations for a geographic region (e.g., from the game database 330). The player locations may be represented as points on a map, where the map is a two-dimensional representation of the physical world. The chat room module 330 groups player locations into aggregated points on the map.

In one embodiment, to group the player locations, the chat room module 330 breaks the map into a multitude of cells (e.g., S-cells) covering portions of the geographic area. The cells are geometric shapes that divide up the geographic region. The size of the cells may be determined via input from a provider or based on the contents or user population of the geographic region. The chat room module 330 assigns each player location to a cell on the map and creates a singular point (referred to as a "aggregated point") for each cell, and the chat room module 330 weights the aggregated points by the number of player locations assigned to that particular cell. Generally, the point weight increases with the number of players associated with that aggregated point. For example, an aggregated point for a cell with twenty player locations assigned to it may have a higher point weight than an aggregated point for a cell with only three player locations assigned to it. The point weight may be the number of players associated with an aggregated point (i.e., the aggregated points of the previous example would have point weights of twenty and three, respectively) or some other function of the number of players. The chat room module 330 also assigns the aggregated point to a location in the geographic region corresponding to the cell (e.g., the middle of the cell or the mean of the player locations represented by the aggregated point). Thus, an aggregated point represents one or more users located within the cell associated with the aggregated point.

The chat room module 330 uses iterative clustering on the aggregated points to determine centroids based on distance between the centroids and the corresponding aggregated points. For convenience, this specification describes k-means clustering a uses the term "iterative k-means clustering." However, other clustering algorithms may be used.

To begin iterative k-means clustering, the chat room module 330 randomly selects a number of locations in the geographic region to be centroids. In some embodiments, the chat room module 330 selects the number of locations using a random grid generator or k-means++ initialization. A provider may specify, via the game server 110, the number of centroids for the chat room module 330 to use or the chat room module 330 may determine the number of centroids to use based on the number of weighted aggregated points for the geographic region. The chat room module 330 assigns each aggregated point to the nearest centroid. The aggregated points assigned to a centroid define a centroid area. For example, geographic area made up from all of the S-cells corresponding to the aggregated points assigned to the centroid. The chat room module 330 determines the mean location of the assigned aggregated points for each centroid area and updates the centroids to be at the corresponding mean locations. The chat room location module 330 iterates this process using the updated centroids until one or more completion criteria are met.

The chat room module 330 can employ multiple different completion criteria for iterating using k-means clustering. In one embodiment, the chat room module 330 finishes iterating when none of the aggregated points move from one centroid area to another between one iteration and the next. In other embodiments, the completion criteria are met when the average distance from each aggregated point to its centroid is less than a threshold value or a specified number of iterations have been completed.

The chat room module 330 performs iterative border adjustment to modify the centroid areas determined using k-mean clustering. Using the centroid areas generated from the final iteration of the iterative k-means clustering, the chat room module 330 determines the cluster weight of each centroid area based on the point weights of its assigned aggregated points. In one embodiment, the cluster weight for a centroid area is the cumulative number of players associated with it. For example, a centroid area may be assigned three aggregated points, which have ten, seventeen, and five player locations associated with them, respectively. Therefore, the cluster weight would be thirty-two.

The chat room module 330 reassigns aggregated points between centroids to more closely balance the cluster weights of the centroids. The chat room module 330 determines how to reassign aggregated points for each iteration of the iterative border adjustment based on one or more conditions. In one embodiment, the chat room module 330 reassigns aggregated points if a pair of centroids includes a source centroid and a sink centroid and the source centroid has a centroid area larger than a minimum size. A centroid is a source centroid if its cluster weight (representing the number of player locations associated with the centroid) is higher than the average (e.g., mean) cluster weight of all the centroids and a sink centroid if its cluster weight is lower than the average (e.g., mean) cluster weight of all the centroids. In other embodiments, a centroid is a source centroid if the cluster weight is above a maximum threshold and a sink centroid if the cluster weight is below a minimum threshold. These thresholds may be set numbers given by a provider or may be a certain percentage of the player population. These conditions help prevent the chat room module 330 from moving players from high cluster weight centroid to low cluster weight centroid, thereby balancing the effects of the player locations on the determined chat room locations. Based on the conditions, the chat room module 330 determines a set of aggregated points to move between centroids, calculates a moving cost of moving the aggregated points, and moves the aggregated points with the lowest moving cost.

For each iteration of the iterative border adjustment, the chat room module 330 finds neighboring centroid pairs where one centroid is a source centroid and the other centroid is a sink centroid and the centroid areas are directly adjacent to one another in the geographic region. For each neighboring centroid pair, the chat room module 330 determines if the source centroid is above a minimum size. The size of the source centroid may be the physical size of the corresponding area in the geographic region, the cluster weight, or a combination of both (e.g., the area and weight must both be above corresponding thresholds). In some embodiments, the chat room module 330 only uses centroids with centroid areas between a minimum and maximum area size for the centroid pairs to avoid creating chat rooms that are too close together in dense urban areas. For neighboring centroid pairs that satisfy these conditions, the chat room module 330 identifies a set of aggregated points to move from the source centroid to the sink centroid of the neighboring centroid pair and calculates the moving cost of moving a set of aggregated points from the source centroid to the sink centroid.

The moving cost is a function of the increase in the average distance between each aggregated point and the source centroid if the aggregated points are reassigned to the sink centroid. For example, aggregated points closer to the border between the two centroid areas of a centroid pair would have a lower moving cost than aggregated points near the center of the centroid area of a source centroid. In some embodiments, the moving cost is based on the point weights of the aggregated points. The chat room module 330 moves the aggregated points between centroids of a neighboring centroid pair with the lowest moving cost, provided the moving cost is below a threshold moving value, and makes one move per iteration of the iterative border adjustment. In further embodiments, the chat room module 330 moves multiple sets of aggregated points per iteration.

In some embodiments, the chat room module 330 checks if moving the set of aggregated points satisfies a moving cost threshold. The chat room module 330 determines the moving cost of the set of aggregated points and if the moving cost is above the moving cost threshold (i.e., the average distance has increased too much), the chat room module 330 does not reassign the set of aggregated points. Otherwise, the chat room module 330 reassigns the set of aggregated points. The moving cost threshold may be determined by the provider or may be determined based on the population of players within the geographic region, among other methods.

The chat room module 330 determines new centroids from the means of the centroids with their new assigned aggregated points, as was done with iterative k-means clustering. The chat room module 330 iterates through the steps of determining cluster weights of the centroids, reassigning aggregated points, and determining new centroids until a set of criteria are met. These criteria may include there being no neighboring centroid pairs with both a source centroid and a sink centroid, no source centroids above a minimum area size, no source centroids above a minimum cluster weight, no valid centroid pairs for which the moving costs are below the threshold moving value. In further embodiments, the chat room module 330 finishes iterating through the iterative border adjustment after a fixed number of iterations, which may be entered by a provider. The chat room module 330 may also finish iterating once all centroid areas of the neighboring pairs contain a number of player locations between a minimum and maximum threshold.

The chat room module 330 creates chat rooms in the virtual world for the geographic areas corresponding to the centroids. The chat rooms may be located at points of interest within the geographic area corresponding to a centroid. In various embodiments, the chat room module 330 places one chat room corresponding to each centroid. For a given centroid, the chat room module 330 retrieves the locations of points of interest within the centroid area from the game database 340. In one embodiment, the chat room module 330 places the chat room for a centroid at the point of interest in the centroid area that is closest to the centroid. Alternatively, the chat room module 330 may locate the chat room at the point of interest in the centroid area with the highest amount of player interactions or the lowest average (e.g., mean) distance to the player locations corresponding to the centroid. In yet another embodiment, the chat room module 330 places the chat room at the centroid, such that the chat room is not necessarily located at or near a point of interest. The chat room module 330 facilitates conversations between player at the chat room locations and stores information describing the chat room locations and the conversations in the game database 340.

The game database 340 includes one or more machine-readable media configured to store game data used in the location-based game to be served or provided to client devices 120 over the network 130. The game data stored in the game database 340 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, player inventory, current player locations in the virtual world/real world, player energy level, player preferences, team information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player locations, past player locations, player moves, player input, player queries, player communications, etc.); (8) data associated with virtual experiences (e.g., locations of virtual experiences, players actions related to virtual experiences, virtual events such as raids, etc.); and (9) any other data used, related to, or obtained during implementation of the location-based game. The game data stored in the game database 340 can be populated either offline or in real time by system administrators or by data received from players, such as from one or more client devices 120 over the network 130.

The game database 340 may also store real-world conditions data. The real-world condition data may include the aggregate locations of players in the real world; player actions associated with locations of cultural value or commercial value; map data providing the locations of roads, highways, and waterways; current and past locations of individual players; hazard data; weather data; event calendar data; activity data for players (e.g., distance travelled, minutes exercised, etc.); and other suitable data. The real-world condition data can be collected or obtained from any suitable source. For example, the game database 340 can be coupled to, include, or be part of a map database storing map information, such as one or more map databases accessed by a mapping service. As another example, the game server 110 can be coupled to one or more external data sources or services that periodically provide population data, hazard data, weather data, event calendar data, or the like.

Other modules beyond the modules shown in FIG. 3 can be used with the game server 110. Any number of modules can be programmed or otherwise configured to carry out the server-side functionality described herein. In addition, the various components on the server-side can be rearranged. Other configurations will be apparent in light of this disclosure and the present disclosure is not intended to be limited to any particular configuration.

Chat Room Location Clustering Examples

Figure 4A:
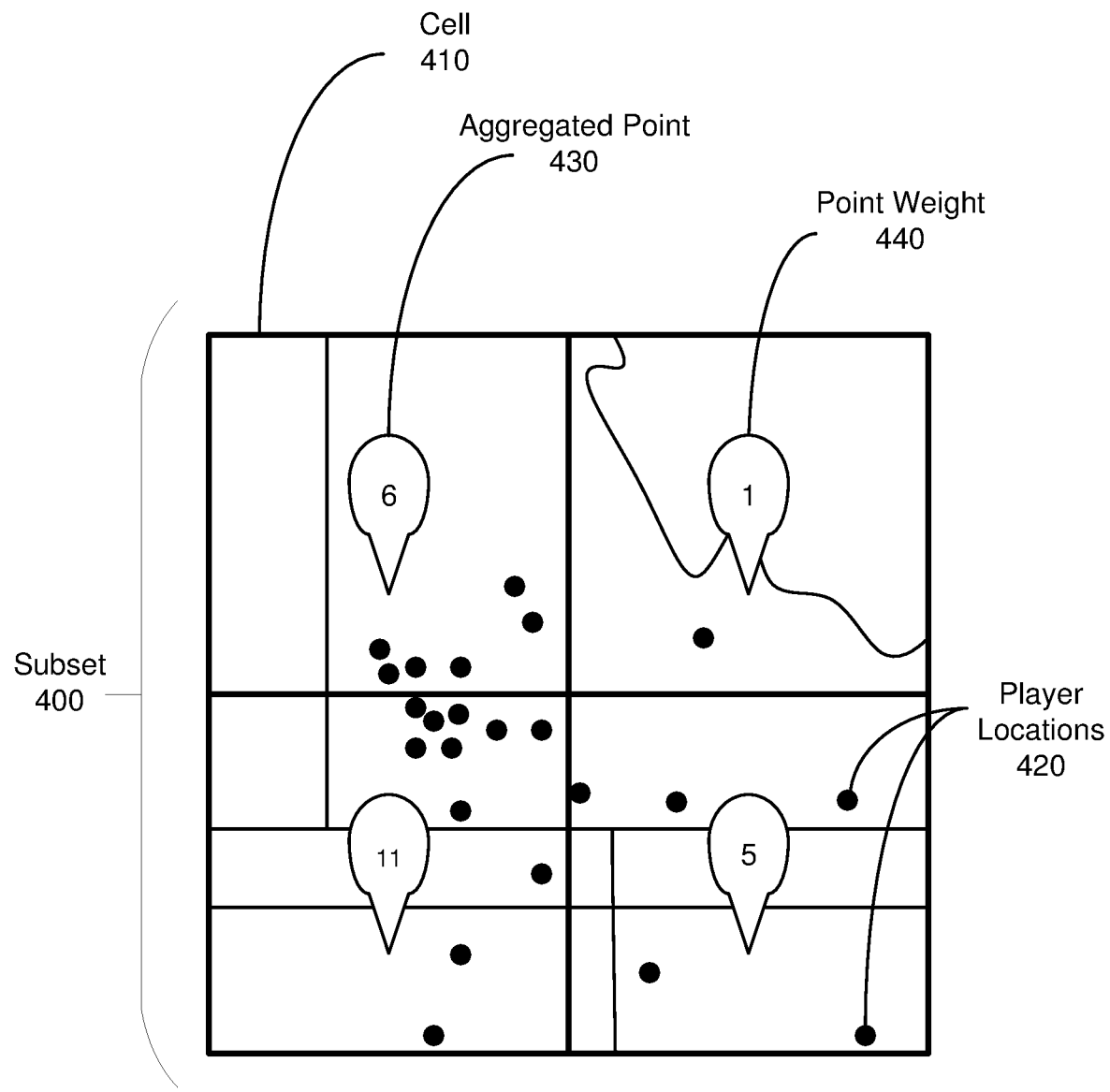
FIGS. 4A-4B are an example of player locations grouped into aggregated points within a geographic region, which are used to further determine centroids, according to one embodiment.
Figure 4B:
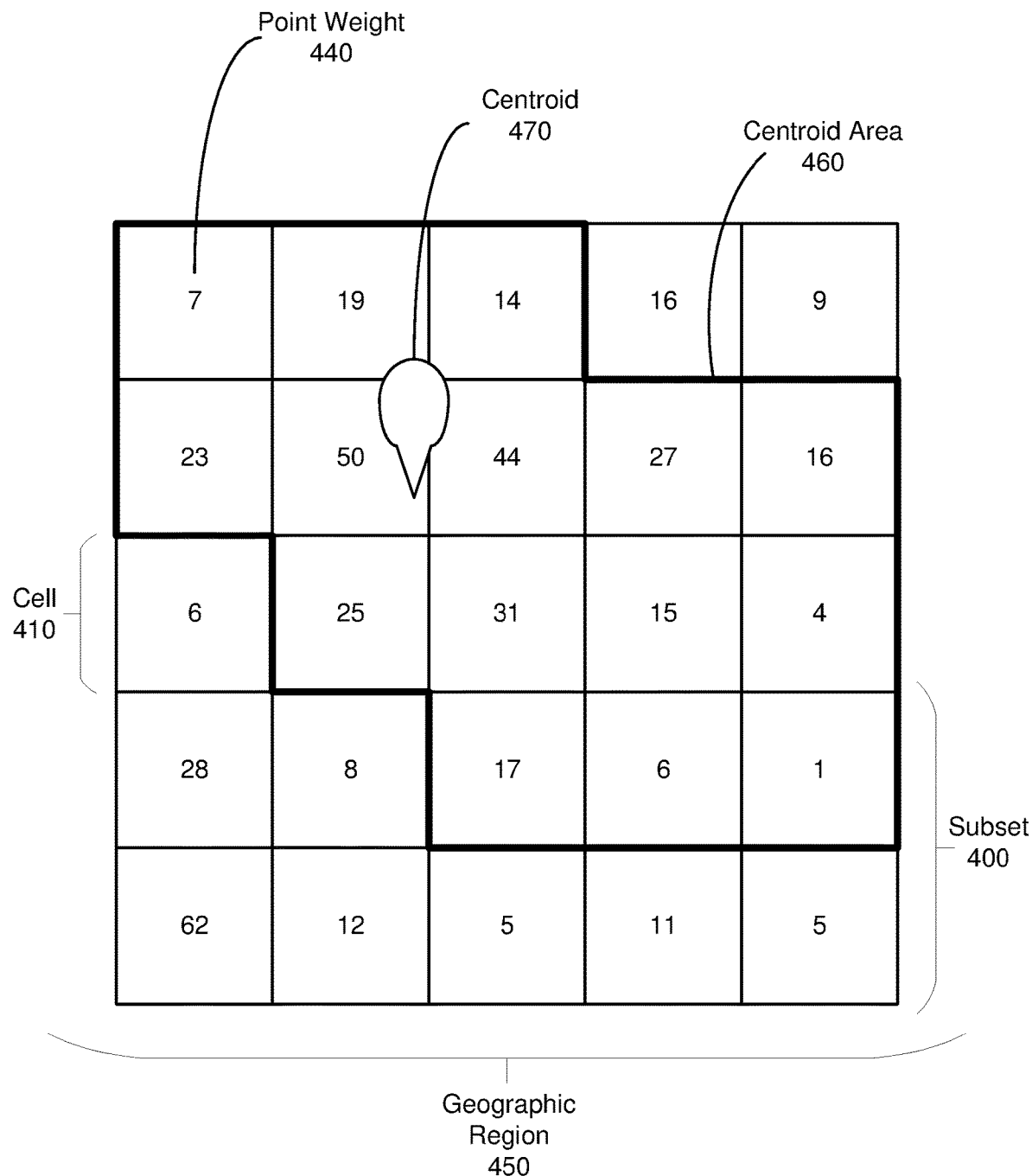

FIGS. 4A-4B are an example of player locations grouped into aggregated points within a geographic region, which are used to further determine centroids, according to one embodiment. In FIG. 4A, a subset 400 of a geographic region contains 4 cells 410 with player locations 420 scattered throughout the cells 410. Since each cell 410 has player locations 420 located within it, and each cell 410 is associated with an aggregated point 430. The aggregated points 430 are weighted by the number of player locations 420 in the cells 410. In this example, the point weight 440 is the number of player locations 420, such as 6 for the top left cell 410 or 5 for the bottom right cell 410. FIG. 4B shows the entire geographic region 450 of FIG. 4B, which includes a centroid area 460 of a centroid 470 and the subset 400 of the geographic region 450. The centroid area 460 only cover s a portion of the geographic region 450. The centroid 470 is located within the centroid area 460 based on the point weights 440 for each cell 410 within the centroid area 460. In particular, the centroid 470 is located within the centroid area 460 at a location with large point weights.

Figure 5A:
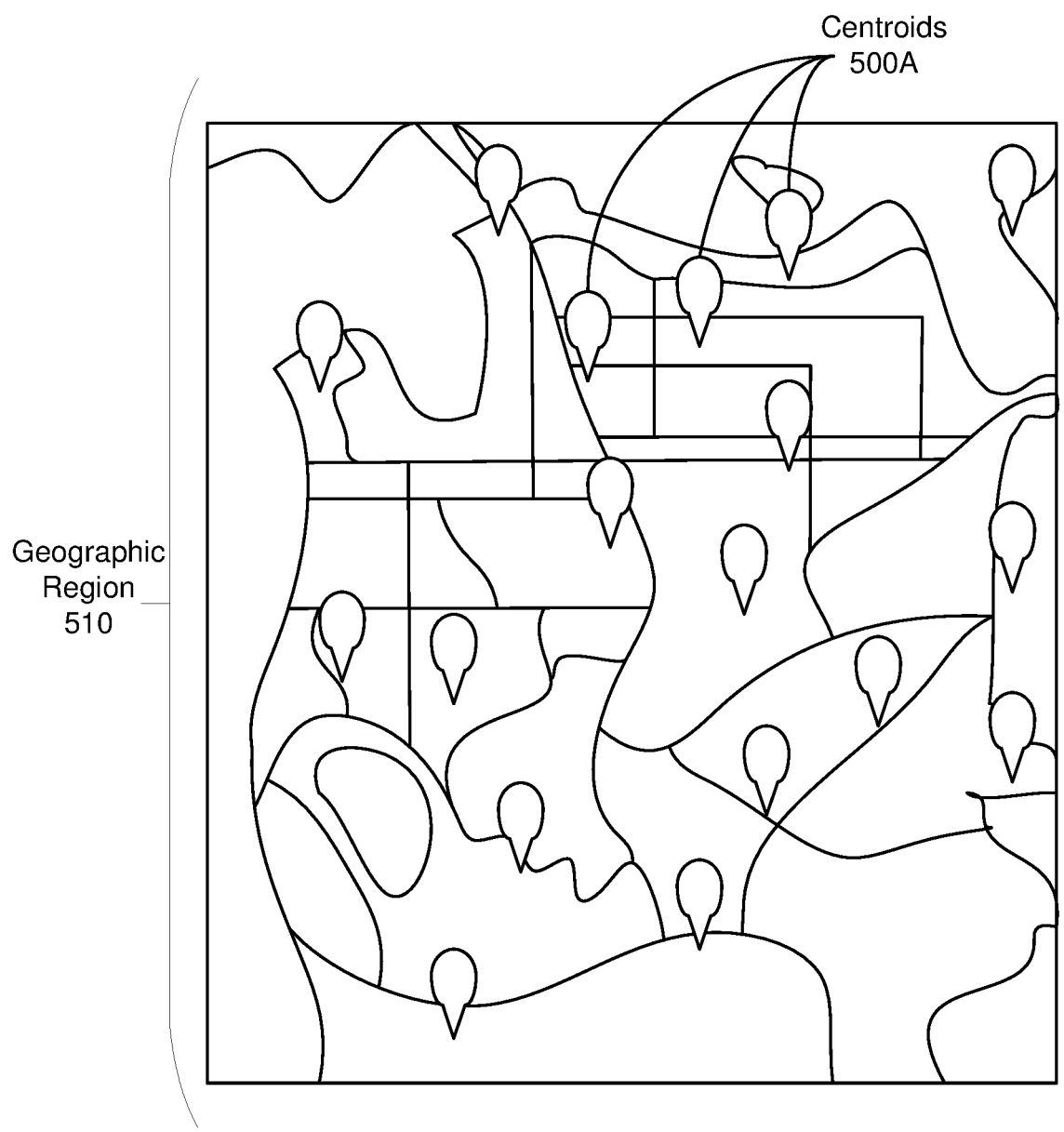
FIGS. 5A-5C illustrate centroids at various stages of a process for determining chat room locations, according to one embodiment.
Figure 5B:
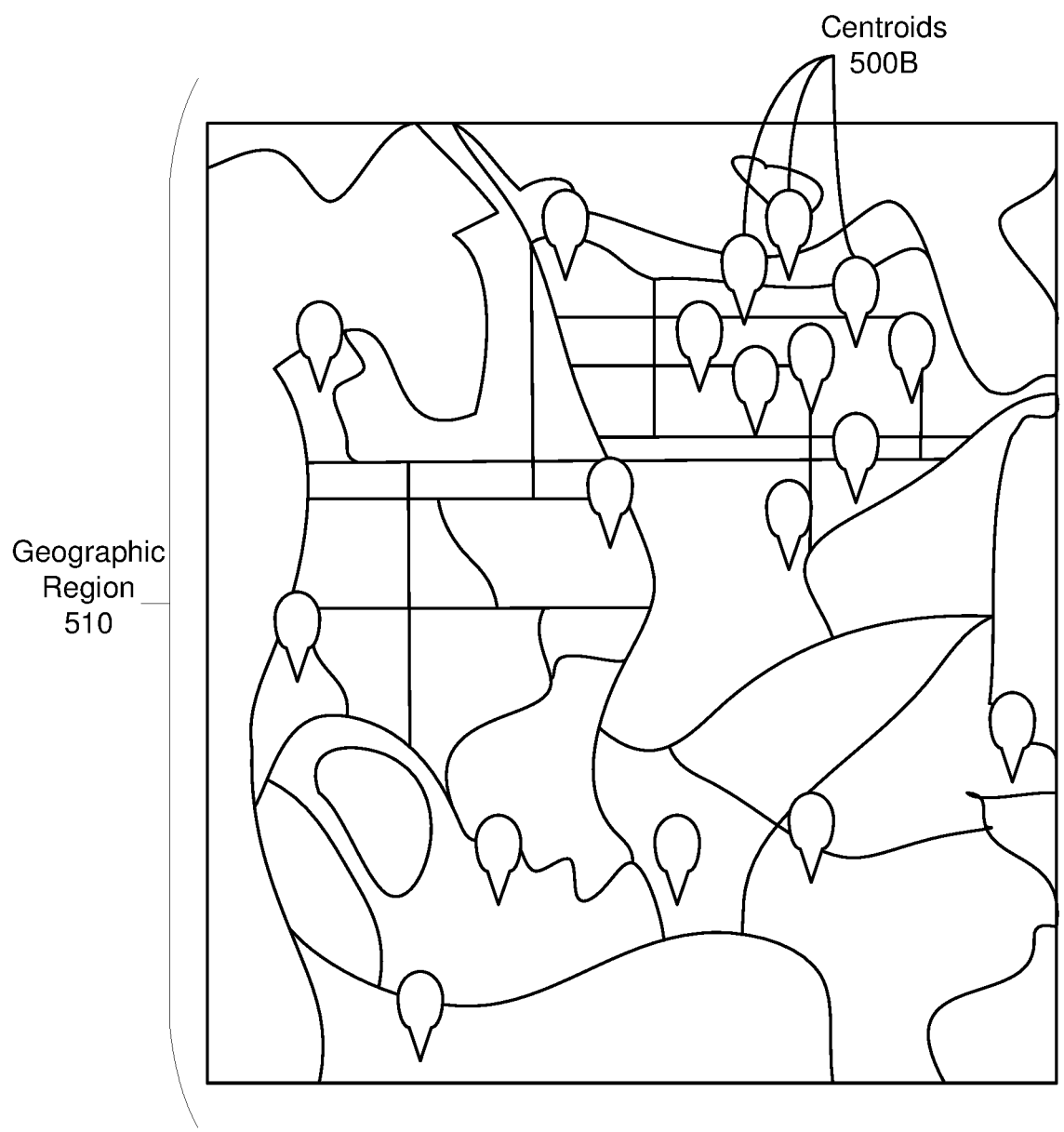
Figure 5C:
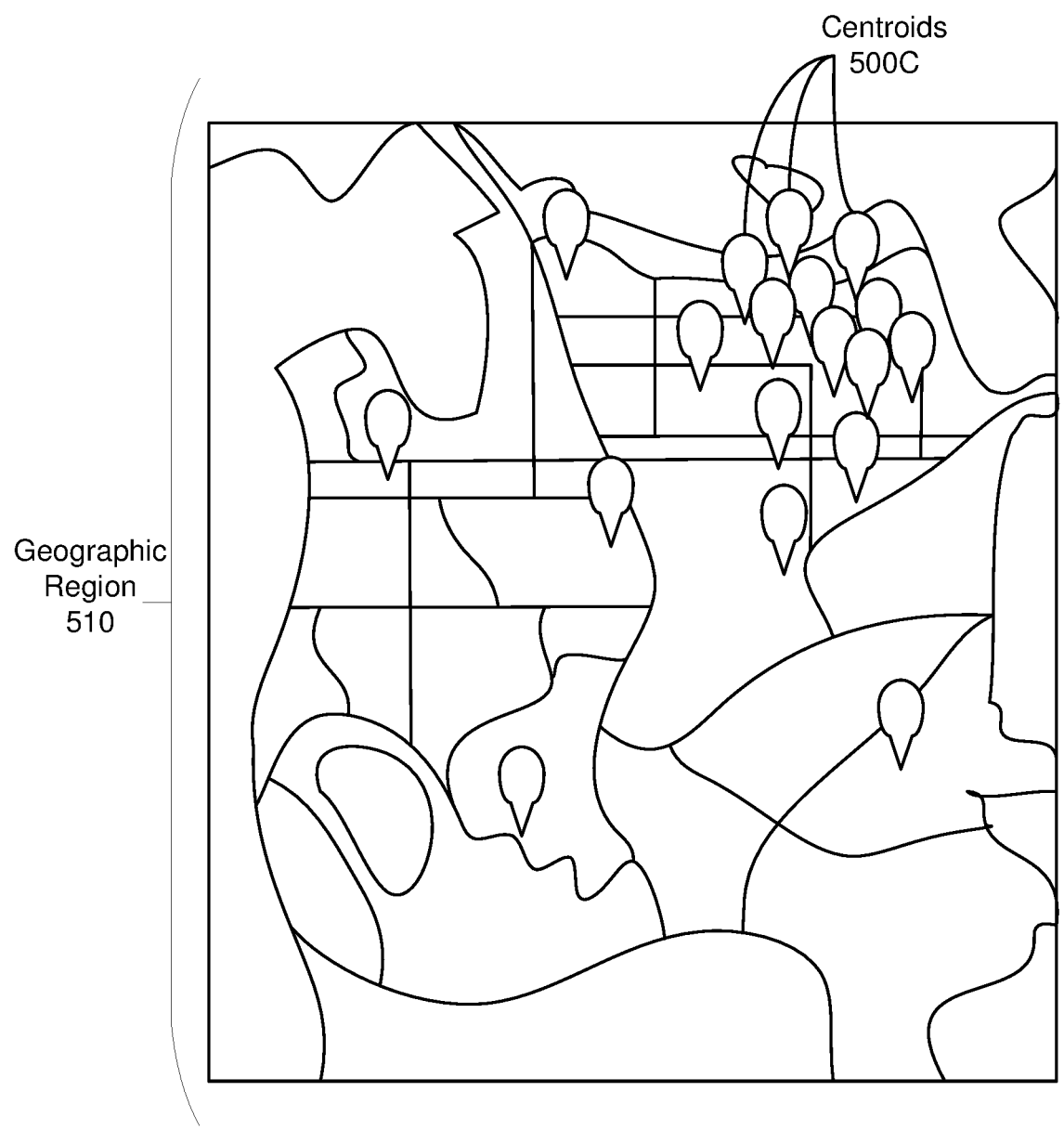

FIGS. 5A-5C illustrate centroids 500 throughout the process of performing iterative k-means clustering and iterative border adjustment, according to one embodiment. FIG. 5A shows initial set of centroids 500A randomly generated by the chat room module 330 for a geographic region 510. FIG. 5B shows the centroids 500B after the chat room module 330 has performed iterative k-means clustering. Here, the centroids 500B are more concentrated to one region at the top right of the geographic region 510. FIG. 5C shows the centroids after the chat room module 330 has performed iterative border adjustment. Here, the centroid 500C are more clustered in the top right corner of the geographic region 510 than the centroids 500B of FIG. 5B. This indicates that there is likely a high density of player locations 420 in that portion of the geographic region 510.

Figure 6:
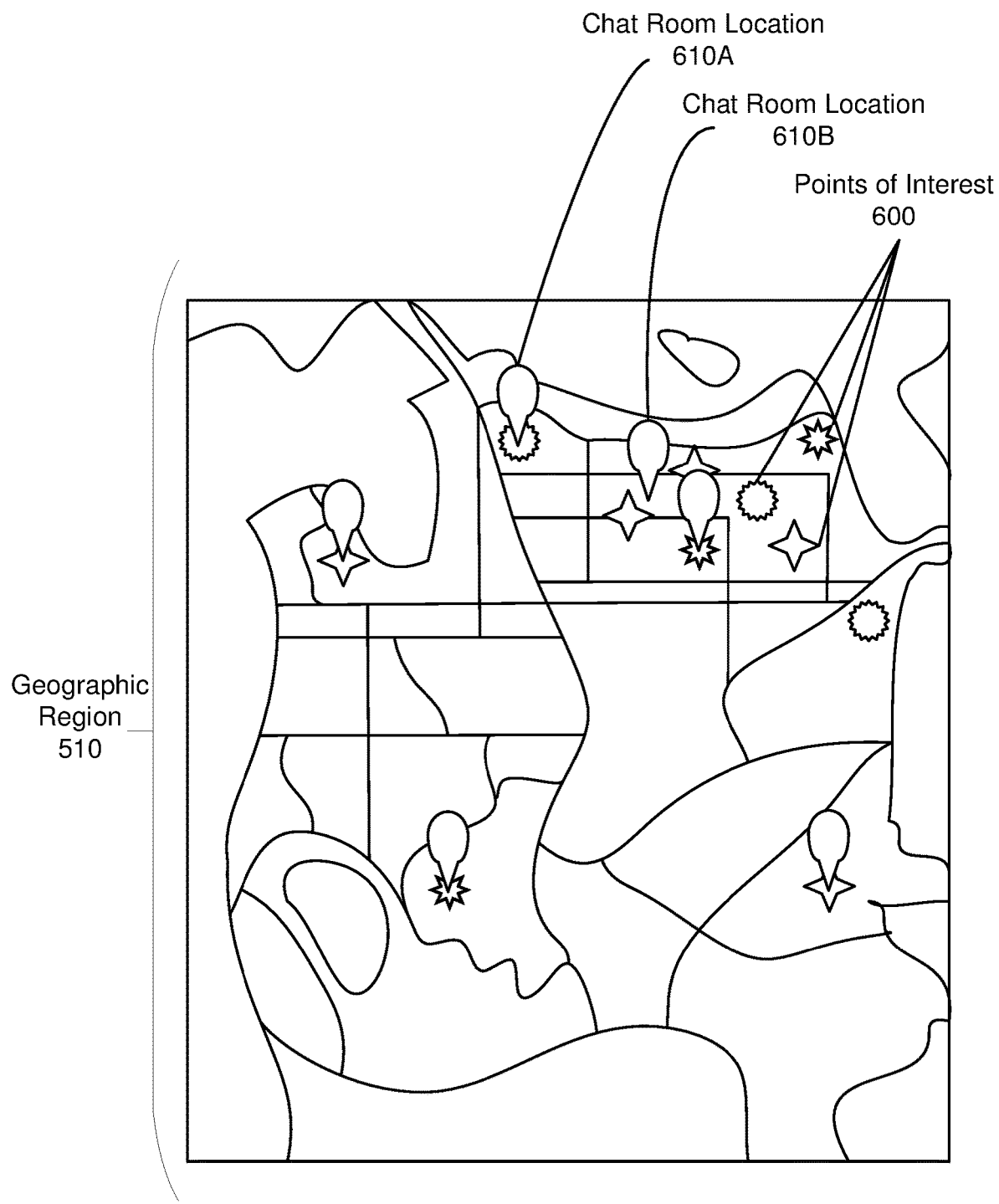
FIG. 6 is an example of chat room locations with points of interest within a geographic region, according to one embodiment.

FIG. 6 is an example of chat room locations 610 associated with points of interest 600 within a geographic region, according to one embodiment. The chat room locations may be located at points of interest 600, like chat room location 610A, or may be located within a portion of the geographic region 510 with a dense amount of points of interest 600, like chat room location 610B. The chat room module 330 may determine chat room locations 610 based on the locations of the points of interest 600, either through weighting centroids by number of interactions with points of interest in an associated aggregated point or cell or through locating a certain number of chat rooms at points of interest with a high amount of user activity.

Exemplary Flow Diagrams for Determining and Selecting Chat Room Locations

Figure 7:
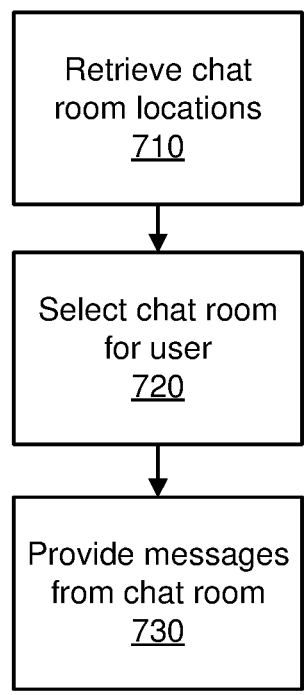
FIG. 7 is a flowchart depicting a method for providing messages from a chat room to a user, according to one embodiment.

FIG. 7 is a flowchart depicting a method for providing messages from a chat room to a user, according to one embodiment. The game server 110 retrieves 710 chat room locations and selects 720 a chat room for a user of the virtual reality game to join. In some embodiments, the game server 110 receives the location of the user and selects the chat room located closest to the user. In other embodiments, the game server 110 provides the user with multiple chat room options based on the user's current location, desired path, virtual elements, other users the user has an affinity for, or any other criteria. The game server 110 provides 730 messages from the chat room to the user through the user interface module 230 of the user's client device 120.

Figure 8:
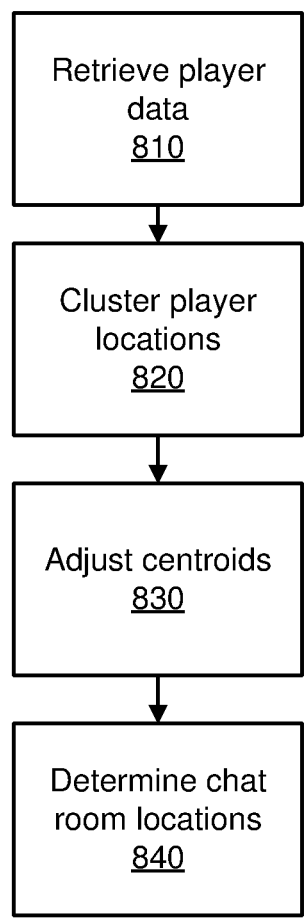
FIG. 8 is a flowchart depicting a method for determining chat room locations, according to one embodiment.

FIG. 8 is a flowchart depicting a method 710 for determining chat room locations, according to one embodiment. The game server 110 may determine the chat room locations via the chat room module 330, and in some embodiments the chat room module 330 employs a machine-learned model to determine the chat room locations. The game server 110 retrieves 810 player data from the game database 340 describing player location information. In some embodiments, the same method 710 is performed using other game data, such as point of interest locations. The game server clusters 820 player locations into aggregated points by breaking up the geographic region for the chat room locations into cells weighted by player locations. The game server 110 generates a set of centroids with assigned aggregated points and iteratively adjusts 830 the centroids based on constraints, such as the distances of the aggregated points to the centroids and the cluster weights of the centroids. In some embodiments, this is done through iterative k-means clustering followed by iterative border adjustment. The game server 110 iteratively adjusts the centroids until a set of criteria is met, such as that no aggregated point moving between centroids between iterations. Additional criteria may include that there are no neighboring centroid pairs with both a source centroid and a sink centroid, no source centroids above a minimum area size, no source centroids above a minimum cluster weight, no valid centroid pairs for which the moving costs are below the threshold moving value. In further embodiments, the game server 110 adjusts the cluster weights of each centroid such that the cluster weight of each centroid is as close to average for all of the centroids as possible without increasing the average distance from centroid to assigned aggregated point by a threshold amount.

Finally, the game server 110 determines 840 the chat room locations based on the centroids after adjustment. In some embodiments, the game server 110 also retrieves locations of points of interest in the virtual reality game and places chat room locations at the point of interest locations. Further, the game server may only place chat room locations at point of interest locations with the highest numbers of user interactions, according to another embodiment.

Figure 9:
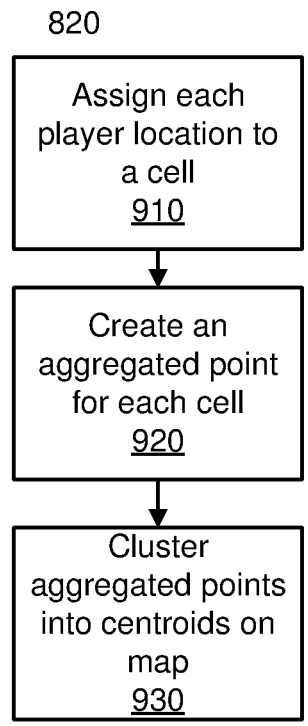
FIG. 9 is a flowchart depicting a method for grouping aggregated points into centroids on a map, according to one embodiment.

FIG. 9 is a flowchart depicting a method 820 for clustering player locations into aggregated points on a map, according to one embodiment. In this embodiment, the game server 110 assigns 910 each player location to a cell. Cells are geometric shapes that divide up a geographic region (e.g., S-cells). The game server 110 creates 920 a singular point for each cell, known as an aggregated point, which is associated with a point weight and a location in the geographic region. The game server 110 clusters 930 the aggregated points into centroids using a clustering algorithm (e.g., k-means clustering).

Figure 10:
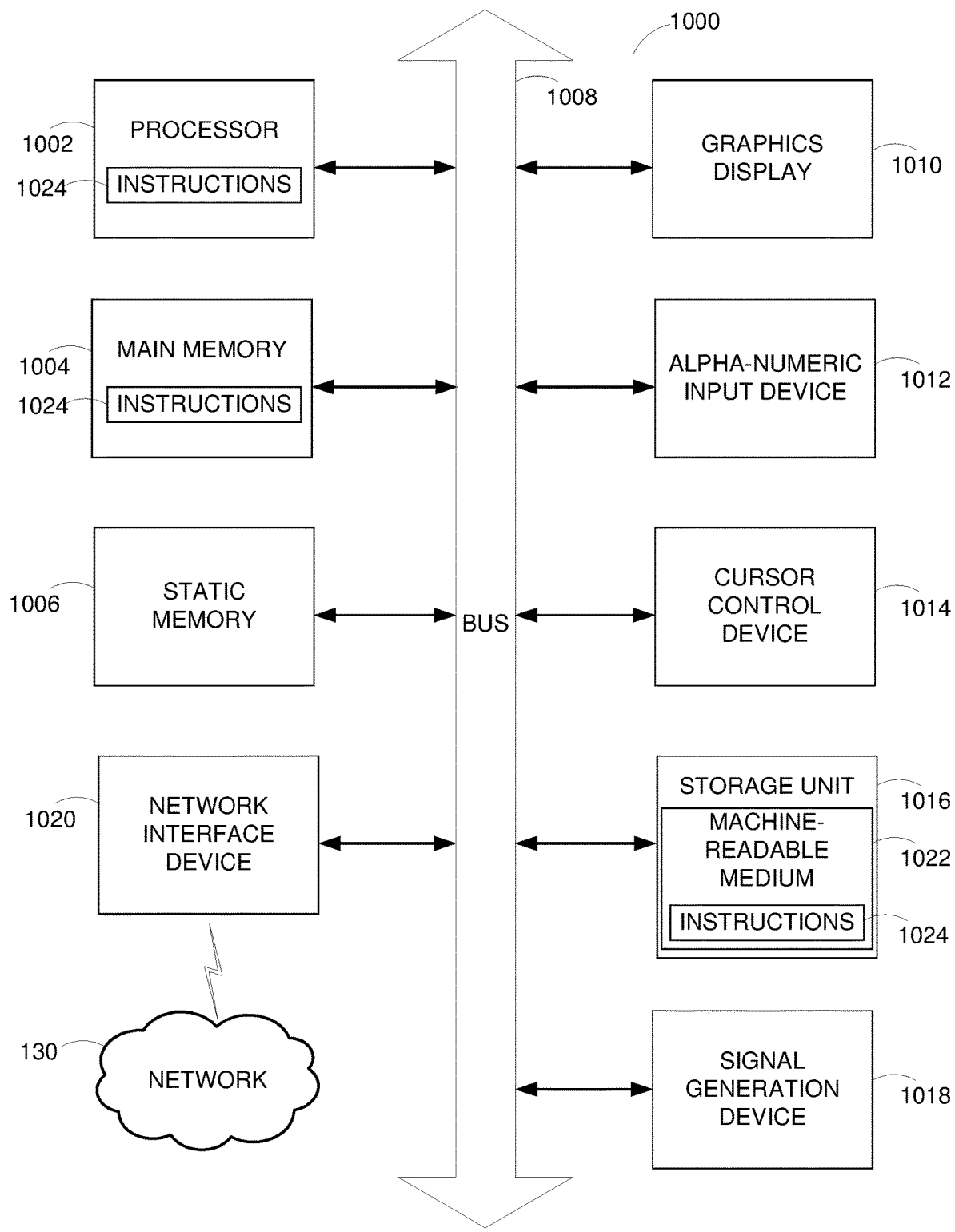
FIG. 10 is a block diagram illustrating an example computer suitable for use in the network computing environment of FIG. 1, according to one embodiment.

FIG. 10 is a block diagram illustrating an example computer suitable for use in the network computing environment of FIG. 1, according to one embodiment. Specifically, FIG. 10 shows a diagrammatic representation of a machine in the example form of a computer system 1000. The computer system 1000 can be used to execute instructions 1024 (e.g., program code or software) for causing the machine to perform any one or more of the methodologies (or processes) described herein, including those associated, and described, with the components (or modules) of a game server 110 or client device 120.

The machine may be a server computer, a client computer, a personal computer (PC), a tablet PC, a set-top box (STB), a smartphone, a network router, switch or bridge, a cell phone tower, or any machine capable of executing instructions 1024 (sequential or otherwise) that specify actions to be taken by that machine. Further, while only a single machine is shown, the term "machine" shall also be taken to include any collection of machines that individually or jointly execute instructions 1024 to perform any of the disclosed methods.

The example computer system 1000 includes one or more processing units (generally one or more processors 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference to a processor 1002 may refer to a single processor or multiple processors. The computer system 1000 also includes a main memory 1004. The computer system may include a storage unit 1016. The processor 1002, memory 1004, and storage unit 1016 communicate via a bus 1008.

In addition, the computer system 1000 can include a static memory 1006, a display driver 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 which may store instructions 1024 (e.g., software) for performing any of the methods or functions described herein. The instructions 1024 may also reside, completely or partially, within the main memory 1004 or within the processor 1002 (e.g., within a processor's cache memory) during execution by the computer system 1000. The main memory 1004 and the processor 1002 also constitute machine-readable media. The instructions 1024 may be transmitted or received over a network 130 via the network interface device 1020.

While the machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methods or functions disclosed herein. The term "machine-readable medium" includes, but is not limited to, data repositories in the form of solid-state memories, optical media, and magnetic media.

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Reference to servers, databases, software applications, and other computer-based systems, as well as actions taken and information sent to and from such systems, are provided to illustrate various concepts. One of ordinary skill in the art will recognize that the inherent flexibility of computer-based systems allows for a great variety of possible configurations, combinations, and divisions of tasks and functionality between and among components. For instance, server processes may be implemented using a single server or multiple servers working in combination, databases and applications may be implemented on a single system or distributed across multiple systems, and distributed components may operate sequentially or in parallel.

In situations in which the systems and methods access and analyze personal information about players, such as location information, the players may be provided with an opportunity to control whether programs or features collect the information. No such information or data is collected or used until the player has been provided meaningful notice of what information is to be collected and how the information is used. The information is not collected or used unless the player provides consent, which can be revoked or modified by the player at any time. Thus, the player can have control over how information about the player is collected and used by the application or system. In addition, certain information or data can be treated in one or more ways before it is stored or used, so that it is anonymized. For example, a player's identity may be treated so that no personally identifiable information can be determined for the player.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for using ad hoc neural networks to process transactions. Thus, while particular embodiments and applications have been illustrated and described, it is to be understood that the described subject matter is not limited to the precise construction and components disclosed. The scope of protection should be limited only by the following claims.

What is claimed is:

1. A non-transitory computer-readable storage medium storing instructions that, when executed by a computer system, cause the computer system to:
    retrieve locations for chat rooms, wherein the locations for the chat rooms were automatically determined by:
        retrieving user data for users of a mobile application, the user data describing user locations within geographic areas;
        retrieving interest locations of points of interest within the geographic areas; and
        for each geographic area:
            identifying a subset of the interest locations within the geographic area;
            selecting an interest location that has the highest number of user interactions of the subset of interest locations within the geographic area; and
            placing the chat room at the selected interest location;
    select one of the chat rooms for a user of a client device connected to the server for the mobile application; and
    automatically provide messages associated with the selected chat room for display to the user within the mobile application.

2. The non-transitory computer-readable storage medium of claim 1, wherein the instructions further comprise instructions that, when executed by the computer system, cause the computer system to:
    divide a geographic region of the users into the geographic areas based on the user data.

3. The non-transitory computer-readable storage medium of claim 2, wherein the user data further describes interactions of users with points of interest within the mobile application and wherein the instructions to divide the geographic region comprises instructions that, when executed by the computer system, cause the computer system to:
    assign each user location to a cell on a map;
    create a single point for each cell having a cell location and a weight indicating a number of user locations assigned to the cell; and
    cluster the cell points into points on the map based the cell locations and weights.

4. The non-transitory computer-readable storage medium of claim 3, wherein cells into which user locations are assigned are granular polygons that divide up a map, wherein the map is a two-dimensional representation of the physical world.

5. The non-transitory computer-readable storage medium of claim 1, wherein the instructions further comprise instructions that, when executed by the computer system, cause the computer system to:
    iteratively adjust the border of at least one geographic area in response to a change in a number of users divided into the at least one geographic area exceeding a threshold user population.

6. The non-transitory computer-readable storage medium of claim 1, wherein the instructions further comprise instructions that, when executed by the computer system, cause the computer system to:
    create centroids of the geographic areas at points of interest within the geographic areas.

7. The non-transitory computer-readable storage medium of claim 1, wherein the instructions further comprise instructions that, when executed by the computer system, cause the computer system to:
    iteratively adjust centroids of the geographic areas to minimize an average distance from each user location to the nearest centroid.

8. The non-transitory computer-readable storage medium of claim 1, wherein the instructions to select one of the chat rooms for the user comprises instructions that, when executed by the computer system, cause the computer system to:
    receive a current location of the user; and
    select a chat room for which the chat room location is closest to the user's current location.

9. The non-transitory computer-readable storage medium of claim 1, wherein the instructions to select one of the chat rooms for the user comprises instructions that, when executed by the computer system, cause the computer system to:

receive a current location of the user;
identify a predetermined number of chat rooms for which the corresponding chat room locations are closest to the user's current location; and
receive a selection of one of the predetermined number of chat rooms from a client device of the user.

10. The non-transitory computer-readable storage medium of claim 1, wherein the mobile application is a parallel reality game that comprises a virtual world that parallels the real world and players of the parallel reality game navigate the virtual world by moving in the real world with location-aware client devices.

11. A method comprising:
retrieving, by a server, locations for chat rooms, wherein the server automatically determined the locations for the chat rooms by:
retrieving user data for users of a mobile application, the user data describing user locations within geographic areas;
retrieving interest locations of points of interest within the geographic areas; and
for each geographic area:
identifying a subset of the interest locations within the geographic area;
selecting an interest location that has a highest number of user interactions of the subset of interest locations within the geographic area; and
placing the chat room at the selected interest location;
selecting, by the server, one of the chat rooms for a user of a client device connected to the server for the mobile application; and
automatically providing, by the server to the client device, messages associated with the selected chat room for display to the user within the mobile application.

12. The method of claim 11, further comprising:
dividing a geographic region of the users into the geographic areas based on the user data.

13. The method of claim 12, wherein user data further describes interactions of users with points of interest within the mobile application and wherein dividing the geographic region comprises:
assigning each user location to a cell on a map;
creating a single point for each cell having a cell location and a weight indicating a number of user locations assigned to the cell; and
clustering the cell points into points on the map based the cell locations and weights.

14. The method of claim 13, wherein cells into which user locations are assigned are granular polygons that divide up a map, wherein the map is a two-dimensional representation of the physical world.

15. The method of claim 11, further comprising:
iteratively adjusting the border of at least one geographic area in response to a change in a number of users divided into the at least one geographic area exceeding a threshold user population.

16. The method of claim 11, further comprising:
creating centroids of the geographic areas at points of interest within the geographic areas.

17. The method of claim 11, further comprising:
iteratively adjusting centroids of the geographic areas to minimize an average distance from each user location to the nearest centroid.

18. The method of claim 11, wherein selecting one of the chat rooms for the user comprises:
receiving a current location of the user; and
selecting a chat room for which the chat room location is closest to the user's current location.

19. The method of claim 11, wherein selecting one of the chat rooms for the user comprises:
receiving a current location of the user;
identifying a predetermined number of chat rooms for which the corresponding chat room locations are closest to the user's current location; and
receiving a selection of one of the predetermined number of chat rooms from a client device of the user.

20. The method of claim 11, wherein the mobile application is a parallel reality game that comprises a virtual world that parallels the real world and players of the parallel reality game navigate the virtual world by moving in the real world with location-aware client devices.

* * * * *

UNITED STATES PATENT AND TRADEMARK OFFICE
CERTIFICATE OF CORRECTION

| | |
|---|---|
| PATENT NO. | : 11,707,672 B2 |
| APPLICATION NO. | : 17/691371 |
| DATED | : July 25, 2023 |
| INVENTOR(S) | : Liu et al. |

It is certified that error appears in the above-identified patent and that said Letters Patent is hereby corrected as shown below:

In the Claims

In Column 16, in Claim 3, Line 25, delete "based the" and insert -- based on the --, therefor.

In Column 18, in Claim 13, Line 5, delete "based the" and insert -- based on the --, therefor.

Signed and Sealed this
Twenty-eighth Day of November, 2023

Katherine Kelly Vidal
*Director of the United States Patent and Trademark Office*